R. W. KNAPP.
STARTING DEVICE FOR GAS ENGINES.
APPLICATION FILED NOV. 11, 1911. RENEWED OCT. 4, 1913.
1,142,890.
Patented June 15, 1915.
5 SHEETS—SHEET 3.
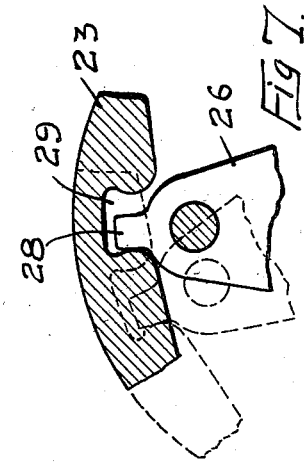
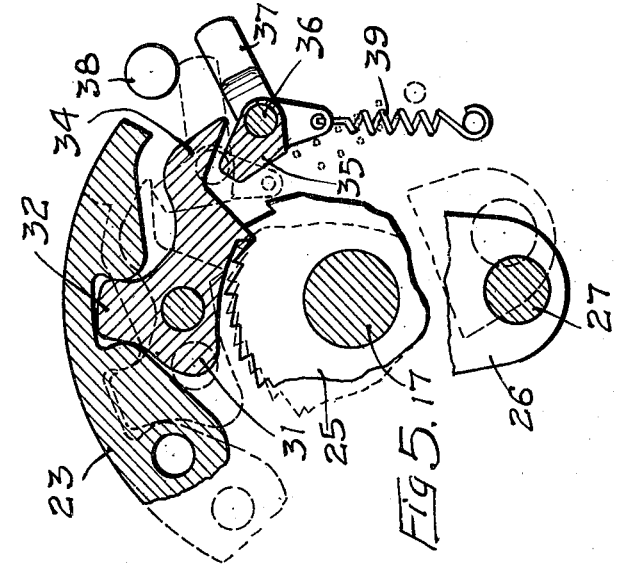
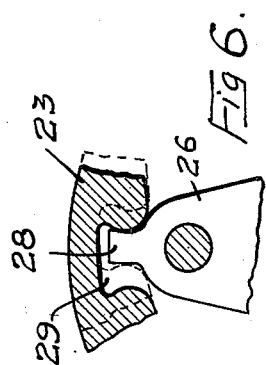
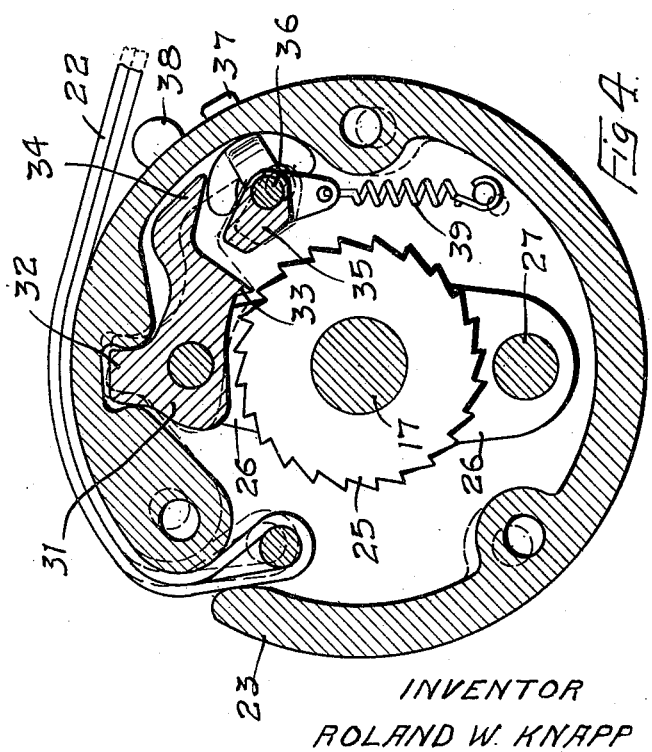
WITNESSES
B. E. Sorensen
C. H. Rehfuss
INVENTOR
ROLAND W. KNAPP
BY Paul & Paul
ATTORNEYS

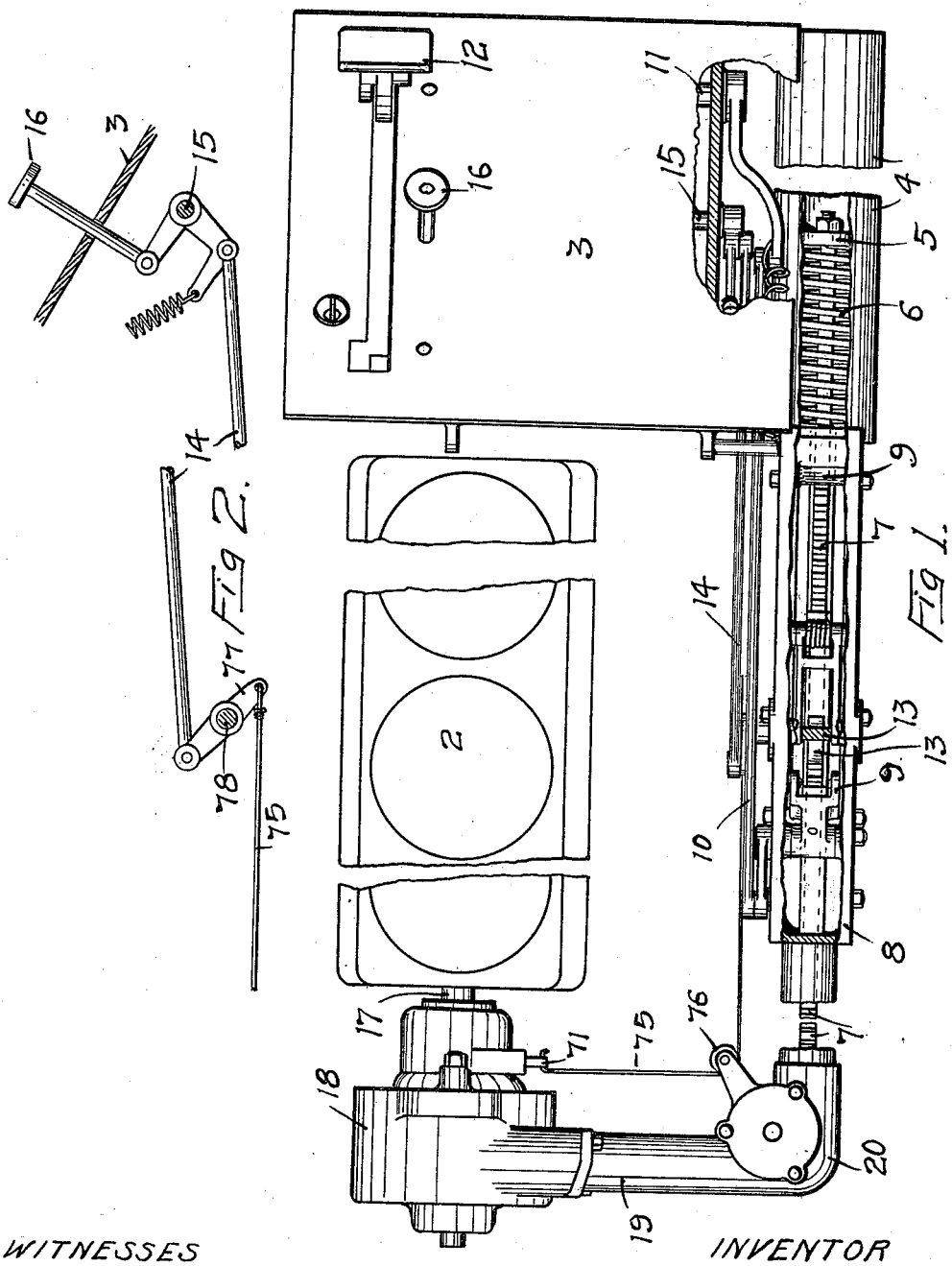

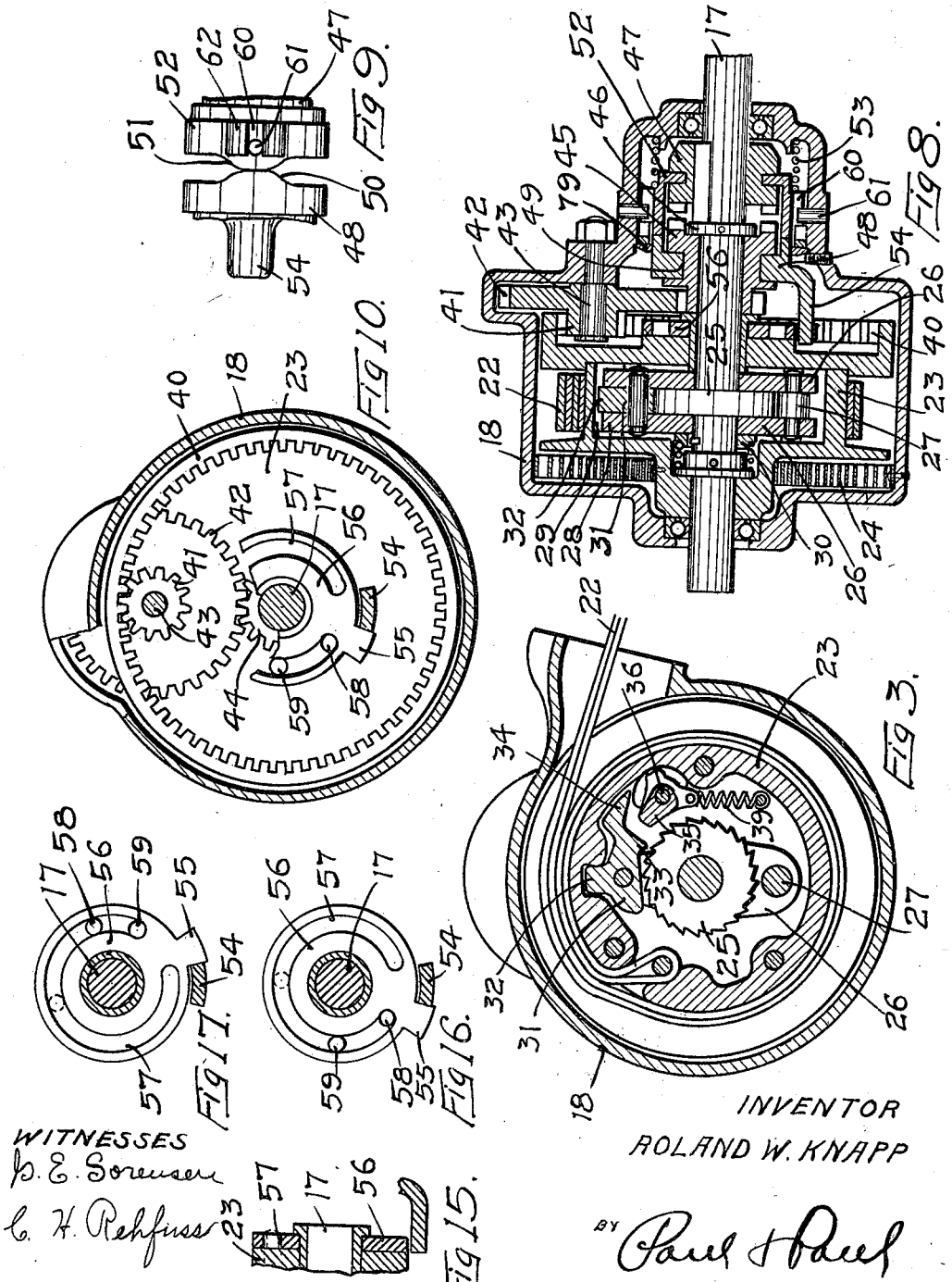

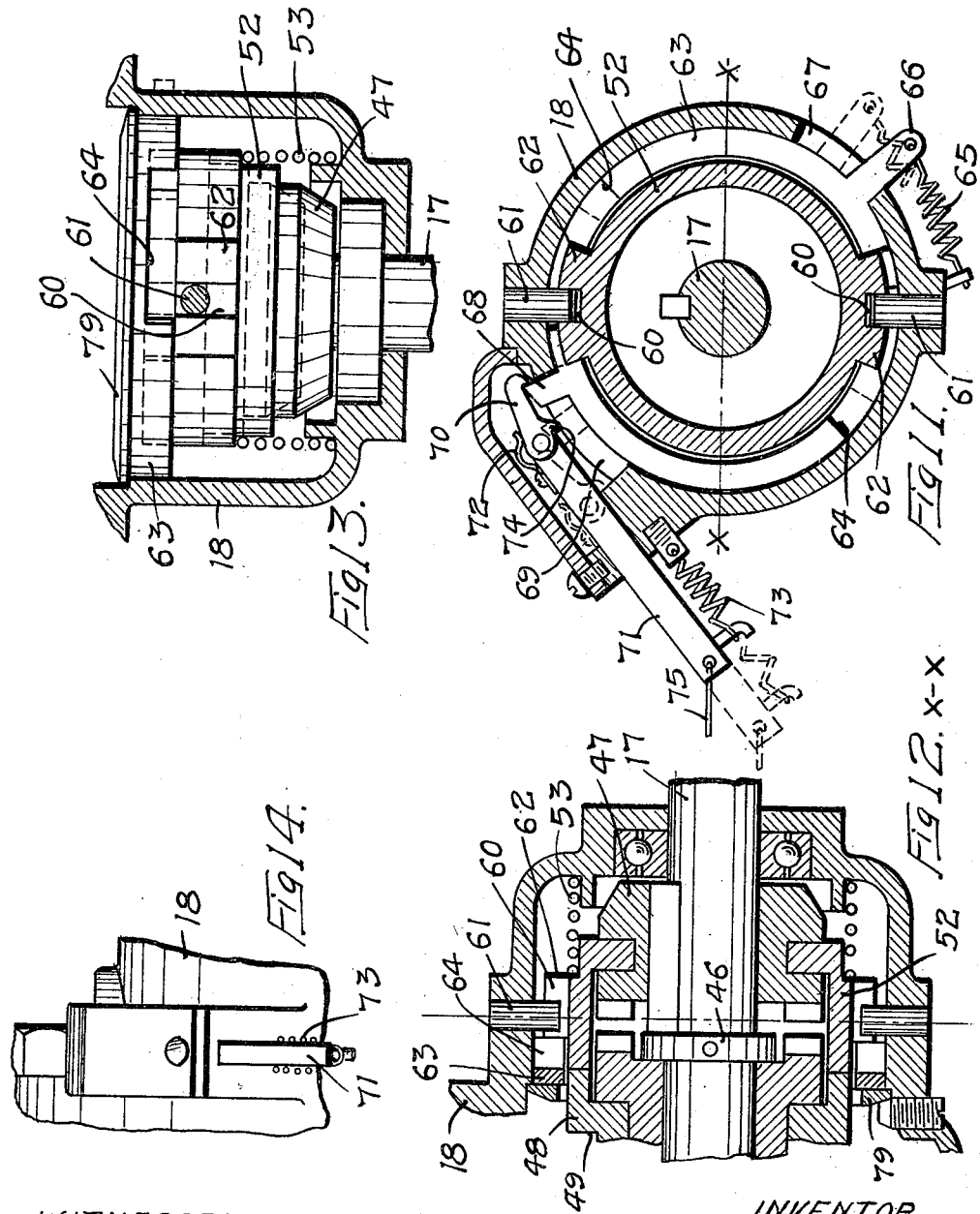

R. W. KNAPP.
STARTING DEVICE FOR GAS ENGINES.
APPLICATION FILED NOV. 11, 1911. RENEWED OCT. 4, 1913.
1,142,890.
Patented June 15, 1915.
5 SHEETS—SHEET 5.
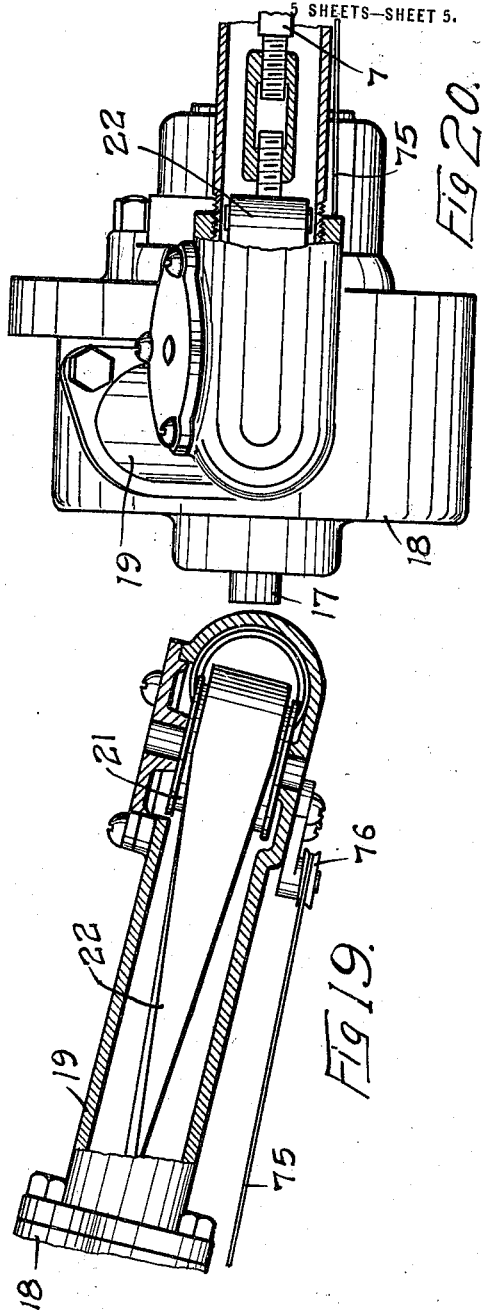
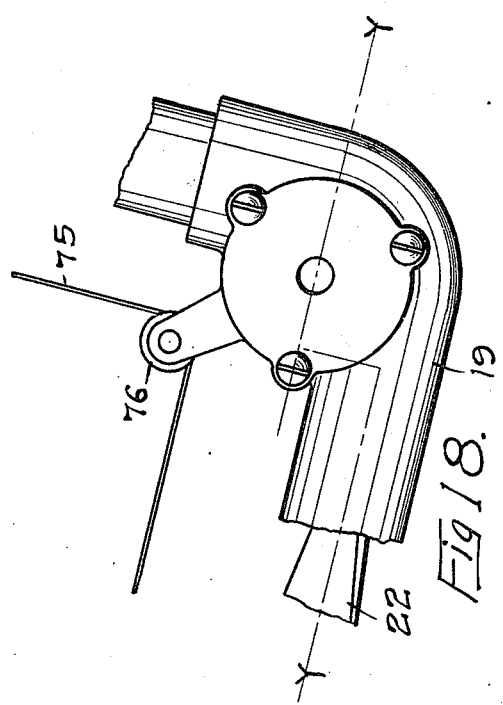
WITNESSES
D. E. Sorensen
C. H. Rehfuss
INVENTOR
ROLAND W. KNAPP
BY
Paul & Paul
ATTORNEYS
THE NORRIS PETERS CO., PHOTO-LITHO., WASHINGTON, D. C.

UNITED STATES PATENT OFFICE.

ROLAND W. KNAPP, OF MINNEAPOLIS, MINNESOTA.

STARTING DEVICE FOR GAS-ENGINES.

1,142,890.   Specification of Letters Patent.   Patented June 15, 1915.

Application filed November 11, 1911, Serial No. 659,749. Renewed October 4, 1913. Serial No. 793,483.

*To all whom it may concern:*

Be it known that I, ROLAND W. KNAPP, of Minneapolis, Hennepin county, Minnesota, have invented certain new and useful Improvements in Starting Devices for Gas-Engines, of which the following is a specification.

The object of my present invention is to provide an apparatus for starting gas engines, designed particularly for use on automobiles, and by means of which an engine of high power can be easily and quickly started from the driver's seat.

The invention consists generally in improved means for resetting the starting mechanism by the power of the engine.

Further the invention consists in means arranged to prevent the power of the engine being applied for resetting the starting mechanism until the engine has acquired the desired speed or momentum.

Further the invention consists in various constructions and combinations, all as hereinafter described and particularly pointed out in the claims.

In the accompanying drawings forming part of this specification, Figure 1 is a plan view of a starting mechanism embodying my invention, Fig. 2 is a detail view, illustrating the connection of the so called "delay mechanism" with the releasing lever or treadle of the starting mechanism, Fig. 3 is a sectional view illustrating the clutch connection between the drum and the engine shaft, showing the strap or flexible connection wound on the drum, Fig. 4 is a similar view, showing the parts in their released position, the strap being unwound from the drum, Fig. 5 is a detail sectional view, illustrating the position assumed by the clutch mechanism in the releasing operation, Figs. 6 and 7 are detail sectional views, showing the position assumed by the dog supporting arms in the releasing operation, Fig. 8 is a longitudinal sectional view through the clutch connection with the engine shaft and the gear mechanism connecting the drum with said shaft, Fig. 9 is a detail view showing the cams which control the movement of the clutch between the engine shaft and the winding drum, Fig. 10 is a detail sectional view of the gear mechanism for re-winding the flexible connection on the drum and re-setting the starting mechanism, Fig. 11 is a detail sectional view of the delay mechanism, or the apparatus by means of which the driver can retard the re-setting of the starting spring by the power of the engine until the engine is running at the desired speed, Fig. 12 is a sectional view taken on the line x—x of Fig. 11, Fig. 13 is a detail sectional view through the casing, looking down on the clutch and retarding mechanism, Fig. 14 is a detail view, looking down on the top of the actuating means for the retarding mechanism, shown in Fig. 11, Figs. 15, 16 and 17 are detail views showing the means for throwing the clutch controlling the re-setting by the engine, on or off, Fig. 18 is a detail view showing the means for carrying the flexible connection between the engine shaft and the starting spring around the forward crank of the car, Fig. 19 is a sectional view on the line y—y of Fig. 18, Fig. 20 is a side view looking toward the engine shaft and the casing mounted thereon, and showing the pipe in section which runs back to the casing of the starting spring.

In the drawing, 2 represents the engine, 3 the foot-board of the car, 4 a cylinder arranged near the foot-board and containing a piston 5 and a spring 6 that is put under compression by the movement of the piston in one direction. A rack bar 7 forms a continuation of the piston-rod and is slidable in a casing 8 which contains an actuating device 9 that is operated through a rod 10 and shaft 11 from the foot lever 12.

13 is a locking mechanism for the rack bar, controlled by a rod 14 operated through a shaft 15 from a second lever or treadle 16. This last described mechanism is for the purpose of setting the piston and spring by hand or foot power, releasing it in the same manner, and forms the subject matter of a companion application herewith. This companion application filed November 11, 1911, Serial No. 659,748 is drawn to cover specifically this mechanism actuated by hand or foot power in combination with a driving connection to the engine shaft expressed in general terms. My present invention, or the one claimed herein, is drawn to the mechanism in connection with the engine shaft, expressed specifically in combination with a starting device expressed in general terms.

The shaft 17 of the engine has a casing or head 18 mounted thereon, provided with a lateral extension 19 terminating in an elbow 20 having a pulley 21 mounted therein, (see Fig. 19), around which a suitable flexible connection, such as the strap 22, passes from the end of the rack bar 7 to a hollow drum 23 that is loosely mounted on the engine shaft within the casing 18. This strap, when fully wound, may make any suitable number of turns around the drum and the slack is taken up in the strap by means of a spring 24.

25 is a ratchet wheel secured on the engine shaft.

26 represents plates loosely mounted on said shaft, one on each side of the ratchet wheel 25. The ends of these plates project beyond the periphery of the ratchet wheel and are both contained within the hollow drum. A pin 27 connects the projecting ends of the plates 26 on one side of said wheel and the opposite ends of said plates have lugs 28 thereon, which project into a recess 29 in the wall of the hollow drum, and are free to oscillate a limited distance therein, allowing the plates to swing back and forth on the shaft. A spring pressed plate 30 is provided on the shaft and adapted to bear on one of the plates 26 with sufficient pressure to retard the free movement of said plates while allowing them to oscillate with the movement of the drum. (See Fig. 8).

Between the plates 26 on the opposite side of the ratchet wheel 25 from the pin 27, I pivot a dog 31 having a lug 32 to enter the recess 29 in the drum, and a spur 33 that is adapted to engage the teeth of the ratchet wheel. (See Figs. 3, 4 and 5). When the starting spring is released and the drum revolves toward the right, the dog 31 will be thrown into engagement with the teeth of the ratchet wheel to revolve the wheel and shaft. This movement of the dog will throw the lug 28 against the right hand wall of the recess 29, as shown in Fig. 6, but when the engine has started and the ratchet wheel begins to run faster than the drum, the dog 31 will be tilted backwardly, the lugs 28 swinging back toward the other side of the recess 29 against the left hand wall, as shown in Fig. 7, raising the dog out of contact with the ratchet teeth and preventing it from riding on said teeth during the operation of the engine.

The dog 31 is provided, preferably, with a toe 34 which projects into the path of a trip arm 35 pivoted at 36 in the drum and provided with an operating arm 37 which projects through the wall of the drum into the path of a stationary pin 38. This trip arm is free to rock on its pivot against the tension of a spring 39. When the drum revolves toward the right, or the proper direction to start the engine, the actuating arm 37 will pass under the pin 38 without affecting the dog 31. In case of back fire in the engine, and backward movement of the drum, the arm 37 will contact with the pin 38 to tilt the trip arm, swing it into engagement with the toe 34 and lift the spur 33 out of engagement with the teeth of the ratchet wheel. (See Figs. 4 and 5).

It is desirable in an apparatus of this kind to provide means for setting the starting spring from the driver's seat by suitable mechanism, such as is shown in my companion application herewith, or by means of the power of the engine when started. I have included in this case, within the casing or head 18, a mechanism by means of which the flexible connection or strap is re-wound on the drum and the starting spring re-set by the power of the engine, and I will now proceed to describe this mechanism in detail.

Referring to Figs. 8 and 10, one head of the hollow drum is shown provided with an internal gear 40, which meshes with a pinion 41 on the hub of a gear wheel 42 that is journaled on a shaft 43. The gear 42 meshes with a pinion 44 that is formed on the hub of a clutch member 45 that is loosely mounted on the engine shaft. (See Figs. 8 and 10.) A collar 46 secured on said shaft holds said clutch member against longitudinal movement, and the other clutch member 47, which is splined on said shaft and revolves therewith, also has a limited movement on said shaft toward and from the clutch member 45 to render the clutch operative or inoperative, as desired. A sleeve 48 is mounted in an annular groove 49 in the clutch member 45 and has a cam surface 50 adapted to engage a corresponding surface 51 on a sleeve 52 that is carried by the clutch member 47 and is free to revolve independently of said clutch member 47 and slide simultaneously therewith. A compression spring 53 normally holds the clutch member 47 and the sleeve 52 toward the opposite clutch member and sleeve with a yielding pressure. The sleeve 48 is provided with an arm 54 which extends parallel with the shaft into the path of a lug 55 on the periphery of a disk 56 which is loosely mounted on the engine shaft and has a curved slot 57 to receive pins 58 and 59 which are mounted in the head of the drum. (See Figs. 8, 10, 15, 16, and 17). In the position of the parts as shown in Fig. 10, the pin 58 has reached the end of the slot 57 and caused the lug 55 to actuate the arm 54 to disengage the clutch, the flexible connection being fully wound on the drum and the starting spring put under tension. Upon the release of the starting spring, the drum will be revolved to unwind the flexible connection and when the pin 59 reaches the other end of the slot 57 the disk 56 will be revolved nearly a complete revolution until the lug 55 contacts with the other side of the arm 54 to revolve the sleeve 51 a sufficient distance to allow the clutch to again become operative and the power of the engine be applied to wind up the flexible connection and set the starting spring, the reverse movement of the drum being effected through the gears between the pinion 44 and the internal gear 40.

It is evident that the distance between the pins 58 and 59 will determine the operation of the arm 54 and the setting or releasing of the clutch. These pins being mounted in the heads of the drum, can be set the desired distance apart to properly time the movement of the mechanism. I am able, therefore, with this apparatus, in connection with the mechanism of my companion application herewith, to set the starting spring by hand or foot power or utilize the power of the engine to set the spring.

In the apparatus above described, the clutch device controlling the re-setting of the spring by the power of the engine will be rendered operative positively at a predetermined time, but it often happens in starting an engine that it will have comparatively little power, insufficient, perhaps, to tension the starting spring, or it may race at such a high speed that there will be danger of breaking some portion of the starting mechanism. It is therefore important to provide means in connection with the clutch device which will enable the driver of the car to retard or delay the operation of the clutch until such time as the engine has acquired sufficient speed and power, or at such time as the driver may desire to re-set the starting spring after the car is in motion. With this end in view and referring particularly to Figs. 11, 12 and 13, I provide grooves 60 in the clutch ring 52, (see Figs. 9, 11 and 13) to receive fixed pins 61 mounted in the casing 18. These pins allow the clutch sleeve 52 to slide back and forth with the clutch member 47 to prevent the rotation of said sleeve. The grooves 60 are formed in projections 62 on the surface of the sleeve 52 and a rotating ring 63 has slots 64 therein which are adapted to receive the projections 62 and allow the sleeve to slide toward the drum, and the clutch to become operative. The ring 63 is normally held in its inoperative position by means of a spring 65 attached at one end to the casing and at the other end to an arm 66 which projects outwardly through a slot 67 in the wall of the casing. (See Fig. 11.) When this ring 63 has rotated a predetermined distance, the shoulders 62 will register with the slots 64 and allow the spring 53 to move the sliding clutch member into operative engagement with the other member. The movement of this ring 63 determines, therefore, the time when the engine shaft becomes operatively connected with the drum to wind up the strap thereon and put the starting spring under tension, and to enable the operator to move said ring at the proper time I provide a lug 68 thereon, projecting through a slot 69 in the wall of the casing into the path of a dog 70 that is pivoted on the end of a bar 71. A spring 72 holds the dog in position to engage the lug 68, so that when power is applied to pull the bar 71 outwardly, the ring 63 will be revolved to allow the clutch to become operative. A spring 73 normally holds the bar in the position indicated by full lines in Fig. 11 and when it is pulled out to the position indicated by dotted lines in said figure the wall of the casing will contact with the tooth 74 on the dog 70 and disengage it from the lug 68, allowing the ring 63 to return to its normal position.

A suitable flexible connection, such as a cord or cable 75, is attached to the bar 71 and is carried around a pulley 76 to the lower end of a lever 77 that is mounted on the rock shaft 78 and is connected on the opposite side of the shaft from the cable connection to the rod 14. When the driver forces the treadle 16 downwardly to release the locking mechanism, the power of the spring will be utilized to revolve the shaft and start the engine. As the treadle is depressed the rod 14 will move toward the right in Fig. 1, and the oscillation of the lever 77 will slacken the flexible connection 75 and allow the bar 71 to move from the dotted line position in Fig. 11 to the position indicated by full lines and its dog engage the lug 68 of the rotating ring 63. Then when the driver removes his foot from the treadle 16 the lever 77 will swing back to its normal position, putting the cable 75 under tension and drawing the bar 71 out to the position indicated by dotted lines in Fig. 11, and rotating the sleeve 63 until the slots therein register with the projections 62. Thereupon the clutch will become operative and the power of the engine be applied to wind up the strap and set the spring. Evidently the operator, by keeping his foot on the treadle 16, can fix the time when the clutch shall become operative to apply the power of the engine. He may do this immediately after the engine starts or at any time thereafter. The rotating ring is held in place by any suitable means, such as the collar 79. (See Fig. 12.)

I claim as my invention:—

1. The combination, with an explosion engine shaft and a ratchet secured thereon, of a drum loosely mounted on said shaft, a starting mechanism, flexible means connecting said starting mechanism with said drum, a dog carried by said drum and adapted to engage the teeth of said ratchet wheel, a gear mechanism, including a clutch, operatively connecting said drum with said shaft and becoming operative after a predetermined number of revolutions of said shaft to re-wind said flexible means on said drum and re-set said starting mechanism, and means within control of the operator for timing the setting of said clutch and the operation of said gear mechanism.

2. The combination, with an explosion engine shaft, of a loosely mounted drum having a ratchet connection with said shaft, a starting mechanism having a flexible connection with said drum, said starting mechanism including a releasing device and an operating lever therefor, a gear mechanism, including a clutch, connecting said drum with said shaft and becoming operative after a predetermined number of revolutions of said shaft to re-wind said flexible connections on said drum and re-set said starting mechanism, and means connected with said releasing lever for timing the setting of said clutch and the operation of said gear mechanism.

3. The combination, with an explosion engine shaft, of a loosely mounted drum having a ratchet connection with said shaft, a starting mechanism, flexible means connecting said starting mechanism with said drum, locking means for said starting mechanism, a lever connected with said locking means, a gear mechanism, including a clutch, connecting said drum with said shaft, said gear mechanism normally becoming operative after a predetermined number of revolutions of said shaft to re-wind said flexible connection on said drum, and re-set said starting mechanism, and means connected with said releasing lever for delaying the setting of said clutch and the operation of said gear mechanism, said delaying means becoming operative when said lever is set to release said starting mechanism and allowing said clutch to become set when said lever is returned to its normal locking position.

4. The combination, with an explosion engine shaft, of a drum having a ratchet connection with said shaft, a starting mechanism, flexible means connecting said starting mechanism with said drum, a gear mechanism connecting said drum and shaft and having a clutch, means actuated by the revolution of said drum for positively disengaging said clutch or allowing it to become set to drive said drum from said shaft, said means including a loosely mounted disk having a curved slot therein and a peripheral lug, pins mounted in said drum and projecting into said slot and means in the path of said lug and connected with one of said clutch members to set or release said clutch at predetermined intervals.

5. The combination, with an explosion engine shaft, of a starting mechanism, a drum loosely mounted on said shaft and having a clutch connection with said shaft, and a flexible connection with said starting mechanism, said clutch connection becoming operative after a predetermined number of revolutions of said shaft to rewind said flexible connection on said drum and reset said starting mechanism, and means within control of the operator for timing the operation of said clutch.

6. The combination, with an explosion engine shaft, of a starting mechanism including a releasing device and an operating lever therefor, a loosely mounted drum having a clutch connection with said shaft, flexible means connecting said drum with said starting mechanism, and means connected with said lever for delaying the setting of said clutch, said delaying means becoming operative when said lever is set to release said starting mechanism, and allowing said clutch to become set when said lever is returned to its normal, locking position.

7. The combination, with an explosion engine shaft, of a loosely mounted drum having a ratchet connection with said shaft, a starting mechanism including a releasing device and an operating lever therefor, flexible means connecting said starting mechanism with said drum, a clutch connecting said drum with said shaft and normally becoming operative after a predetermined number of revolutions of said shaft to rewind said flexible connection on said drum and reset said starting mechanism, and means connected with said lever for delaying the operation of said clutch.

8. The combination, with an explosion engine shaft, of a drum having a ratchet connection with said shaft, a starting mechanism, flexible means connecting said starting mechanism with said drum, a gear mechanism connecting said drum and shaft and having a clutch, and means connected with said starting mechanism for delaying the setting of said clutch and the operation of said gear mechanism, said delaying means becoming operative when said starting mechanism is set and allowing said clutch to become operative when said starting mechanism is released.

In witness whereof, I have hereunto set my hand this 3d day of November, 1911.

ROLAND W. KNAPP.

Witnesses:
GENEVIEVE E. SORENSEN,
EDWARD A. PAUL.

Copies of this patent may be obtained for five cents each, by addressing the "Commissioner of Patents, Washington, D. C."